March 17, 1970 R. K. WIANDT 3,501,214

LID LATCH FOR PHONOGRAPH

Filed Jan. 2, 1968

INVENTOR:
RONALD K. WIANDT,

BY Thomas A. Briody
HIS ATTORNEY.

United States Patent Office 3,501,214
Patented Mar. 17, 1970

3,501,214

LID LATCH FOR PHONOGRAPH

Ronald K. Wiandt, Decatur, Ill., assignor to General Electric Company, a corporation of New York Filed Jan. 2, 1968, Ser. No. 695,089
Int. Cl. A47b *81/06*; B65d *43/16*
U.S. Cl. 312—8 3 Claims

ABSTRACT OF THE DISCLOSURE

A latching mechanism for a recording and reproducing device which involves at least two housing members and a simple detent arrangement integrally associated with these two members for maintaining the two members in a closed relationship with respect to each other.

This invention relates to latching mechanisms, and more particularly to a simplified latching mechanism for a compact recording and reproducing device wherein the recording and reproducing mechanism is encased in a pair of pivotally cooperable housing members.

There are numerous occasions when persons in various occupations, such as housewives and businessmen, find need for quickly and conveniently recording messages or letters. For such a purpose it is important that the recording device be sturdy, durable, portable, and very compact in size. In view of its portability, it is also desirable that such a device should have an extremely simplified housing which incorporates a latching mechanism that is characterized by simplicity and ruggedness so that it will readily withstand much usage under widely variant circumstances and conditions.

Accordingly, it is an important object of the present invention to provide an improved latching mechanism for the housing of a recording and reproducing apparatus.

It is a further object of my invention to provide an improved phonograph latching mechanism which is characterized by a simplified and economical structure while yet being rugged and durable.

A still further object of my invention is to obtain a latching mechanism for a phonograph housing wherein there is no stressing of the latching mechanism or its parts when the housing is in its closed condition.

In carrying out the present invention, in one form thereof, there is provided an improved portable recording and reproducing apparatus for disc type records. This apparatus comprises a housing wherein a turntable and a driving motor are located. The housing also supports and contains a recording arm with an associated recording head together with a playback arm and its associated playback head. With this arrangement, the housing includes at least two members, one of which is pivotally supported with respect to the other, and thereby serves as a lid member. The other housing member, is normally stationary and functions as a support member. A pair of spaced apart cam surfaces are formed on the stationary housing member, and a pair of spaced apart depending tabs are formed upon a bottom edge of the lid housing member. These tabs are dimensioned and located upon the lid member so that they coact with associated cam surfacecs of the stationary housing member to retain the two housing members in closed relative position. Trapping interruptions or recesses are also formed in the stationary housing member immediately adjacent to associated cam surfaces of the stationary housing member to enable the tabs of the lid member to snap into detented engagement with the stationary member while yet allowing the tabs to remain in unstressed relationship relative to the cam portions when the housing members are closed. Such a latching structure has proven to be simplified, economical in cost and of very long operative life.

By further aspects of the present invention, additional desirable features may be included in the recording and reproducing apparatus and its associated housing, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

Figures 1, 2, 3, 4:
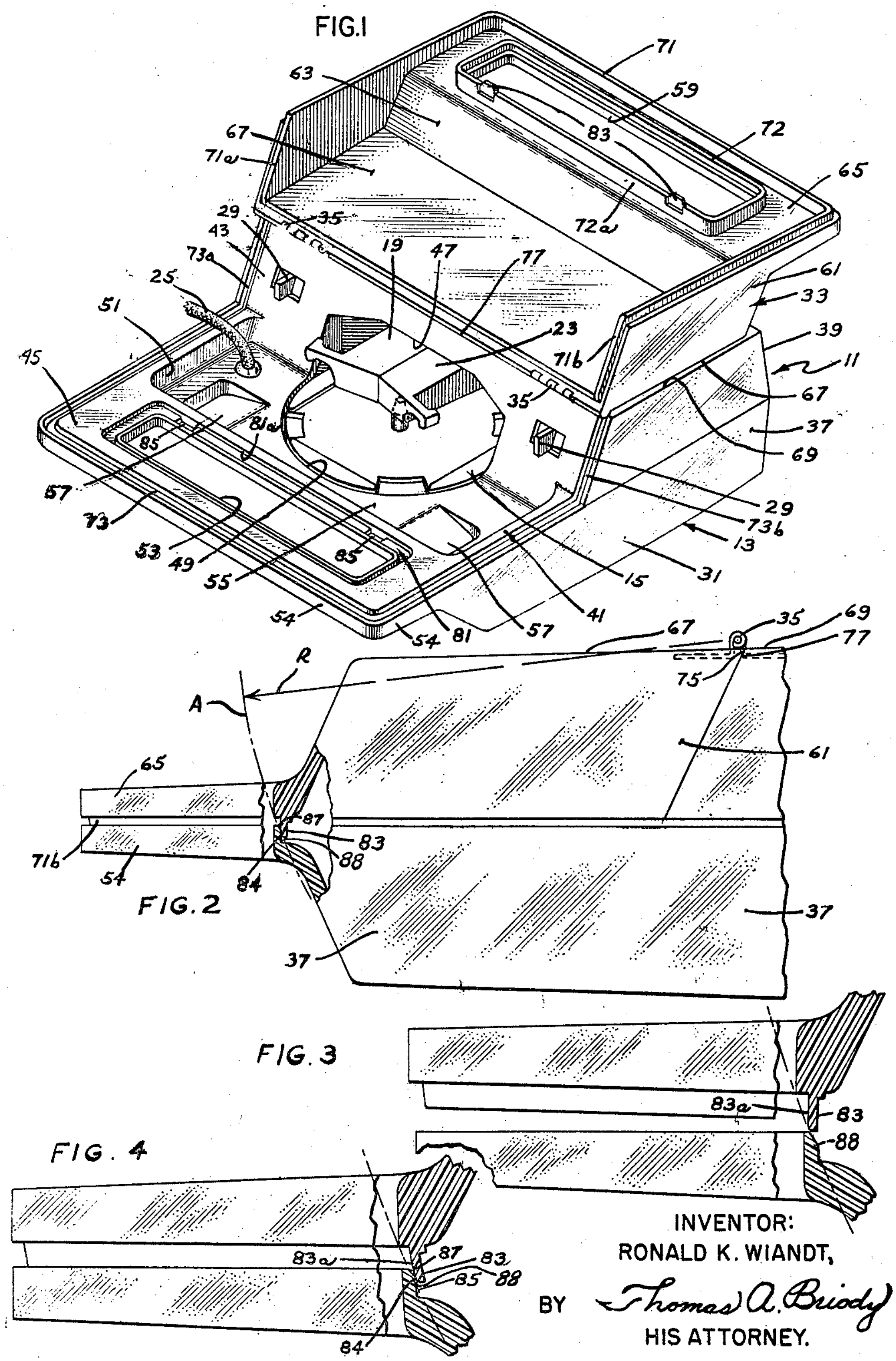
FIG. 1 is a perspective view of a disc type recording and reproducing device embodying the present invention, in one form thereof.
FIG. 2 is a fragmentary side elevation view of the device shown in FIG. 1, with the lid member of the housing in the closed position and a portion of the latching mechanism of the device shown in section, to illustrate the mode of coaction between representative elements thereof.
FIG. 3 is a fragmentary view of the view and structure shown in FIG. 2, but with the lid and stationary members of the housing being shown in their relative positions just prior to engagement of the latching elements of the housing.
FIG. 4 is a view similar to FIG. 3, but showing one of the latching elements in cammed position relative to the other latching element.

Referring in detail to the drawing, and in particular to FIG. 1 thereof, there is shown a disc-type recording and reproducing device 11 embodying one form of my invention. The recording device 11 essentially comprises a housing 13 wherein the turntable 15 and its driving motor (not shown) are located, recording arm 19, playback arm 23, and an amplifier (not shown). It will be understood by those skilled in the art, that the recording device 11 also includes a speaker and a microphone which may be combined into a combination speaker-microphone type of headset connected to cord 25; however for purposes of simplicity, these structures have not been shown in the drawing illustration. For controlling the device 11, there is also provided an "on-off" and volume control knob 27 and a "pause" control knob 29. Knob 29 is thus for selectively coupling and uncoupling the driving motor to the turntable 15 for facilitating desired momentary interruption of its movement.

As shown in FIG. 1, recording arm 19 and playback arm 23 are located in their "rest" position. These arms are normally maintained in such a position when the device is being stored or not in use by means of a suitable detent mechanism. One particularly adaptable detent mechanism for such a purpose is set forth in copending application Ser. No. 611,711 filed on Jan. 25, 1967 now Patent No. 3,375,011.

Turning now to a further discussion of the structure of housing 13 of device 11, attention is directed to FIGS. 1 and 2. As shown therein, the housing 13 has a generally L-shaped bottom portion 31 and a pivoted lid portion 33 which is connected to the bottom portion 31 by a pair of hinges 35.

The bottom portion 31 of housing 13 includes a pair of opposed generally L-shaped side walls 37 which extend vertically and are connected at their rear to a generally vertical rear wall 39. At the front of bottom housing portion 31 there is formed a shallow L-shaped deck 41. Deck 41 includes an inclined section 43 which is disposed at a small angle from normal relationship with respect ot horizontal section 45. Thus, as shown in FIG. 1, the sloped section 43 of deck 41 extends upwardly and rearwardly from the back of horizontal section 45.

The deck 41 of bottom portion 31 of the device housing includes a slot 47 formed in sloped section 43 thereof to provide clearance for movement of the arms 19, 23 and access to the turntable 15. A portion of turntable 15 extends outwardly from slot 47 to allow ready access to the turntable for the placement of removal of records with respect thereto.

In deck 41 of the bottom housing portion 31 there is also formed a semicircular cutout section 49, a recessed tray-like area 51 within which the cutout section 49 is located, and an elongated rectangular handle slot 53. The semicircular cutout section 49 is provided to fit around and accommodate approximately one-half of the turntable 15, which is arranged therein in slightly raised relationship from being flush with the bottom surface 55 of the tray-like area 51. The tray-like area 51 includes a pair of spaced apart inclined recesses 57 for receiving a handset (not shown) when the device 11 is being stored. Elongated handle slot 53 is disposed in a lip-like upper extension 54 of bottom portion 31, and it cooperates with a similarly configured mating handle slot 59 of the lid portion 33 to assume an aligned engagement therewith when lid portion 33 is closed into engagement with bottom housing portion 31 (as shown in FIG. 2). Slots 53 and 59, thus enable the device 11 to be readily carried by the hand of an operator.

Lid portion 33 of housing 13 is shaped to provide a complementary and attractive relationship with the correpsondingly stepped frontal area of bottom portion 31 (as shown in FIG. 1). Thus, more particularly, lid portion 33 is generally L-shaped and it includes L-shaped side walls 61 which are connected to a stepped top 63. Stepped top 63 has the aforementioned handle slot 59 disposed in a lip-like low extension 65 thereof, for carrying cooperation with slot 53 of the bottom portion 31.

When lid portion 33 of housing 13 is in its open position as shown in FIG. 1, its top surface 67 rests upon the top surface 69 of bottom portion 31. Access to the recording and reproducing arms 19, 23, the turntable 15, and knobs 27, 29 is thus readily provided. When lid portion 33 is closed into engagement with bottom portion 31 of the housing, as shown in FIG. 2, the lid portion 33 assumes a generally symmetrical relationship with the frontal exposed section of bottom portion 31, and is in overlying relationship with respect thereto.

As further shown in FIG. 1, near the bottom seam or peripheral edge of the lid portion 33 there is included a partially U-shaped flange 71, which extends downwardly when the lid is closed. Flange 71 has two oppositely disposed vertically inclined extensions **71*a* and 71*b* formed thereon. In addition, imemdiately surrounding the carrying slot 59 of the lid portion 33 there is formed an oblong shaped flange 72** which also extends downwardly when the lid is closed.

For compact cooperation with the depending flange 71 of lid portion 33, there is provided near the upwardly facing seam or peripheral edge of bottom housing portion 31, a mating groove 73. The groove 73 is formed in the front stepped portion of bottom 31 adjacent the periphery of the L-shaped deck 41, and it includes a partially U-shaped section. Groove 73 has two oppositely disposed vertical extensions **73*a* and 73*b* connected thereto. There is also provided in deck 41, surrounding the oblong slot 53, an oblong shaped groove 81. This groove is dimensioned for cooperation with the oblong shaped flange 72 of lid 31**.

When the lid portion 33 of housing 13 is closed into mating engagement with bottom portion 31 thereof, the depending flange 71 enters and mates with the groove 73 to help achieve a compact assembly and also provide an effective dust shield for the handset, turntable and other device components located in and about the interior recesses of the deck 41. By the same token, the depending oblong shaped flange 72 enters and mates with oblong shaped groove 81 to further enhance the preclusion of dust achieved by flange 71 and groove 73 and also to help achieve a compact housing.

Turning now to an important aspect of the present invention whereby there is provided an improved detent mechanism for securing the lid 33 in closed engagement with housing bottom 31, attention is directed to FIG. 2. As shown therein, the lid part 33 of the housing 13 is pivotally secured to top 69 by means of the pair of spaced apart hinges 35 which are located adjacent the forward edge 75 (FIG. 2) of top 69 of bottom 31 and the rear ward edge 77 of lid 33 (FIG. 2). The hinges 35 are so positioned and the lid 33 is so proportioned, with respect to bottom housing portion 31, that when the lid 33 is closed, the lip-like lower extension 65 of the lid aligns itself with the lip-like upper extension 54 of the housing bottom. As previously mentioned, the oblong shaped flange 72 of the housing lid also thereupon cooperates with the oblong shaped groove 81 of the housing bottom 31.

As further shown in FIG. 1, there is formed in the rearward longitudinal side **72*a* of the oblong shaped flange 72, a pair of spaced apart tabs 83. The tabs 83 are offset slightly toward the opening of slot 59 (i.e. forwardly) from rearward part 72*a* of flange 72. These tabs 83 project downwardly in a vertical direction from flange 72, when the housing lid 33 is closed (see FIG. 2). Accurately located on lid member 33, the tabs 83 are disposed so that their outermost forward extremity 84** (FIG. 4), which is near the bottom and forward tip of each, describes a lid opening arc A having a radius of movement R.

The two tabs 83 of lid 33 are designed and located for detenting cooperation with a pair of associated spaced apart slots 85 formed in the oblong shaped groove 81 of the housing bottom 31. Thus, more specifically, as best shown in FIG. 1, the slots 85 are stepped depressions formed in the bottom longitudinal portion of rearward part **81*a* of groove 81. The forward top edge of each of the detent slots 85 has a camming slope 87 formed thereon (see FIG. 4). Camming slope 87 extends downwardly and to the rear in relationship to the forwardmost part of the slot 85 and merges into a trapping interruption portion or recess 88. Trapping interruption 88 may be described as the portion of each slot 85 other than camming slope 87, wherein each tab 83** may be seated without any stresses being exerted thereupon.

When the lid member 33 of the housing is closed into engagement with the L-shaped bottom portion 31 portion 31 thereof, the two depending tabs 83 thereupon pivot about the horizontal axis described by the two hinges 35, from the position suggested by FIG. 1 to the position suggested by FIG. 2. During this relative movement, since the cammings slopes 87 of the groove slots 85 of housing bottom 31 are spaced a smaller distance from the axis of rotation of lid 33 than the radius of movement R of the outermost forward extremities 84 of the follower portions of tabs 83, the camming slopes 87 act upon the tabs 83 to flex them rearwardly (i.e. to the right, or counterclockwise, viewing FIG. 4). So, from a careful comparison of FIG. 3 with FIG. 4, and then of FIG. 4 with FIG. 2, it will be seen that the camming slopes 87 of the groove slots 85 act upon tabs 83 to effectively detent them by flexure of the tabs, into seated cooperation with slots 85.

When the tabs 83 are seated into cooperative engagement with slots 85, each tab 83 is disposed in the portion of an associated slot 85 referred to as trapping interruption 88. As a result the forward surfaces **83*a* (FIGS. 3 and 4) of the tabs are contiguous to, but not in any way stressed by engagement with its associated slot 85. This is a significant advantage, in that it helps to enhance the operative life of the housing 13**.

It might also be otherwise stated that when the tabs 83 are seated in slots 85, they are located in trapping portions 88 of the slots that preclude any stressing of the tabs 83 while also effectively maintaining the housing members 31, 33 in latched relationship.

It will now, therefore, be seen that my new and improved housing detent mechanism is simplified in structure, novel in operation, and economical in cost.

While in accordance with the Patent Statutes, I have described what at present is considered to be the preferred embodiment of this invention, it will be obvious to those skilled in the art that various changes and modifications may be made therein without departing from this invention.

What I claim as new and desire to secure by Letters Patent of the United States is:

1. In a recording and reproducing device, at least two housing members, means for pivotally supporting one of said housing members for movement between an open position and a closed position relative to the other of said housing members about an axis of rotation, a cam surface disposed upon a first one of said housing members, and a tab disposed upon the second of said housing members for coaction with said cam surface during relative movement of said housing members between the open position and the closed position, thereby to latch said two housing members into closed engagement with respect to each other, said tab having a follower surface thereon, said follower surface of said tab being positioned in spaced relationship from said axis of rotation by a predetermined first dimension, said cam surface having a portion thereof positioned in spaced relationship from said axis of rotation by a predetermined second dimension which is of lesser magnitude than said first dimension thereby to enable said cam portion to act upon said follower of said tab during relative pivotal movement of said housing members between the open position and closed position, and a trapping interruption disposed adjacent said cam surface in said first housing member to accommodate said tab and enable said tab of said second member to snap into detented engagement with said first member, said tab of said second member being in an unstressed relationship relative to said cam portion of said first member when said housing members are in closed engagement thereby to enhance the operative life of said housing, said first housing member and the second housing member each have a generally L-shaped configuration, said first housing member having a substantially U-shaped border portion contiguous to a substantially U-shaped border portion of said second housing member when said housing members are in their closed position, a U-shaped groove formed in the first housing member inwardly of and adjacent to its U-shaped border portion, and a U-shaped depending flange formed in the second housing member inwardly of and adjacent to its U-shaped border portion, said flange of said second housing member being located and arranged to cooperate with the U-shaped groove of said first housing member when said housing members are in closed position thereby to help prevent dust from entering the interior of said housing.

2. The device of claim 1, wherein the first and second housing members each include a rectangularly configured handle slot, the handle slots being of similar configuration and dimension to accommodate their cooperative alignment when the housing is in closed position to enable the extension of a hand therethrough for carrying the device.

3, The device of claim 2 wherein the first housing member has a rectangularly configured groove formed therein inwardly of and adjacent to its associated handle slot, and the second housing member has a rectangularly configured depending flange formed therein inwardly of and adjacent to its associated handle slot, said rectangular flange of said second housing member being located and arranged to cooperate with the rectangular groove of the first housing member when said housing members are in closed position, thereby to help prevent dust from entering the interior of said housing adjacent said handle slots.

References Cited

UNITED STATES PATENTS

| | | | |
|---|---|---|---|
| 3,010,552 | 11/1961 | Davidson | 19—57 X |
| 3,029,855 | 4/1962 | Telford | 150—52 |
| 3,031,796 | 5/1962 | Bruscaglioni | 312—208 |
| 3,410,391 | 11/1968 | Kanter | 220—315 |
| 3,412,890 | 11/1968 | Rich | 220—315 X |
| 3,417,897 | 12/1968 | Johnson | 220—315 X |

CASMIR A. NUMBERG, Primary Examiner

U.S. Cl. X.R.

312—244